United States Patent Office 3,373,353
Patented Mar. 12, 1968

3,373,353
ELECTRON BEAM SCANNING SYSTEM FOR QUALITY CONTROL OF MATERIALS
Franklin H. Harris, Accokeek, Md., assignor to the United States of America as represented by the Secretary of the Navy
Filed Sept. 30, 1965, Ser. No. 491,847
5 Claims. (Cl. 324—54)

ABSTRACT OF THE DISCLOSURE

A quality control system for testing the dielectric strength of materials by measuring the thickness thereof utilizing a beam of electrons which are scanned over the material to be tested. A conductive film is positioned on the side of the material to be tested opposite from the side which is scanned by electrons and is positively charged to create an electric field across the test material so that a current flows through points of the material which is proportional to the thickness of the material at these points.

---

The invention described herein may be manufactured and used by or for the Government of the United States of America for governmental purposes without the payment of any royalties thereon or therefor.

The present invention relates to the electronic quality control art and, more particularly, to electronic quality control in the manufacture and testing of thin dielectric films such as used in thin film dielectric capacitors.

Those concerned with the development of thin dielectric films have long recognized the need for a non-destructive, analytical quality control. The present invention fulfills this need. Heretofore, thin dielectric films have been tested for faults by mechanically scanning them with a mercury probe. However, this method suffers from its tediousness and the possible contamination of the dielectric by the mercury. Thin film dielectric capacitors have been tested for faults by impressing a voltage at least as large as the rated voltage of the capacitor across the finished capacitor. But, this method suffers from its non-analytical and, generally, destructive nature.

The general purpose of this invention is to provide a quality control tool for use with thin dielectric films which embraces all the advantages of similarly employed prior art devices but which possesses none of the aforedescribed disadvantages. To obtain this, the present invention contemplates creating an electric field across a thin dielectric film by scanning the naked film with an electron beam and analytically detecting the resultant current flow through the dielectric.

An object of the present invention is the provision of a quality control system useful in manufacturing and testing thin dielectric films.

Another object is to provide an analytical, non-destructive system for detecting faults in thin dielectric films.

A further object of the invention is the provision of an analytical, non-destructive method of determining the location and severity of faults in thin dielectric films.

Still another object is to provide an analytical non-destructive system for determining the uniformity of thickness of thin dielectric films.

Yet another object of the present invention is the provision of an analytical, non-destructive method of determining the uniformity of thickness of thin dielectric films.

Other objects and many of the attendant advantages of this invention will be readily appreciated as the same becomes better understood by reference to the following detailed description when considered in connection with the accompanying drawings wherein.

Figure 4:
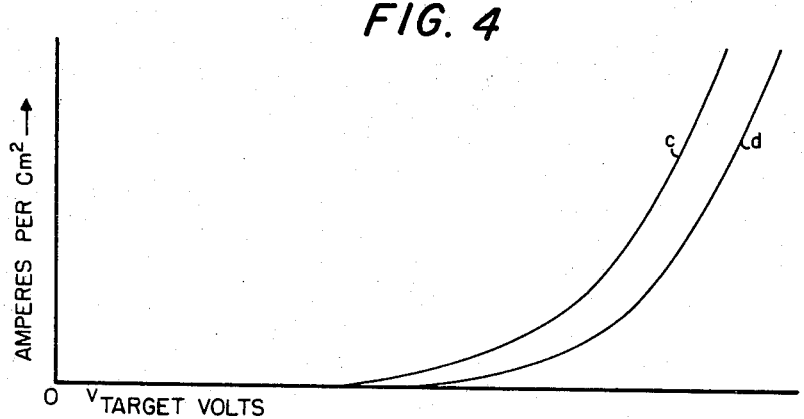
Figure 5:
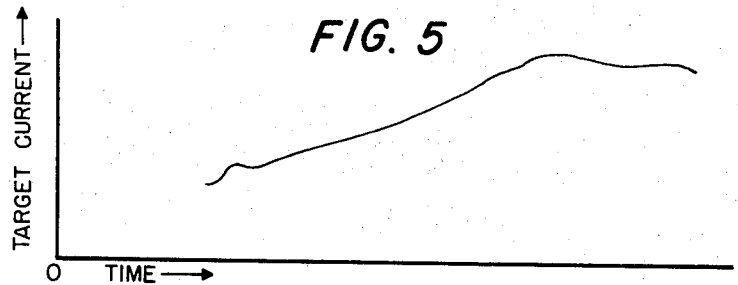

FIG. 4 is a graph showing the difference between the density of the current flowing through the dielectric at points where the thickness of the dielectric is different and is plotted in terms of current density vs. target voltage; and FIG. 5 is a graph plotted in terms of current vs. time showing, for one scan of the electron beam across the dielectric, how the current flowing through the dielectric varies as a function of the thickness thereof.

Figure 1:
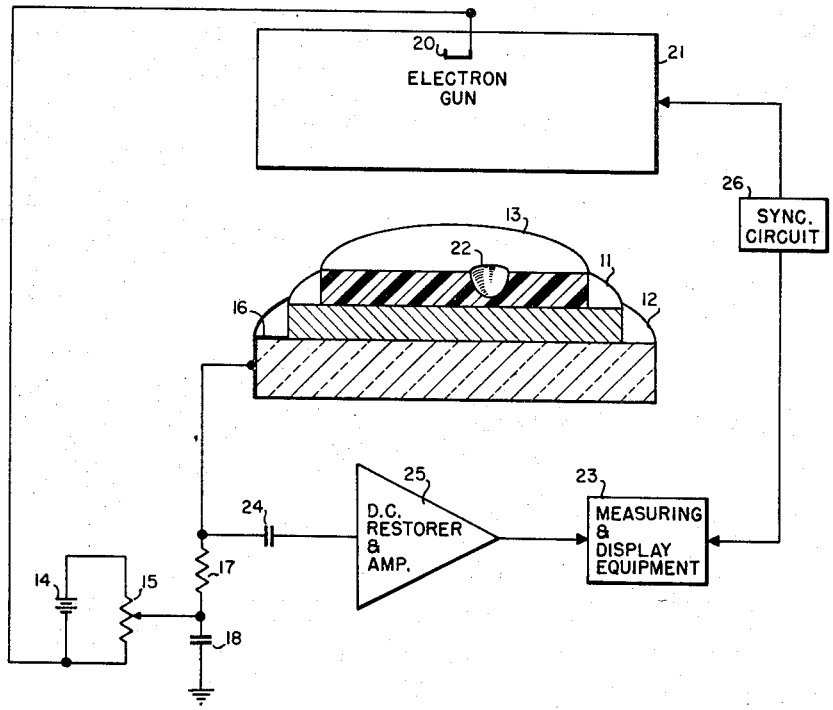
FIG. 1 illustrates an embodiment of the present invention.

Turning now to FIG. 1. When the present invention is used as a quality control step in the manufacture of thin film dielectric capacitors, a thin conductive film 11, which serves as one of the electrodes of the manufactured capacitor, is disposed on a substrate 12 by conventional techniques such as evaporation. Typically, thin conductive film 11 is composed of a material such as aluminum. If the manufactured capacitor is to be used in microelectronic circuitry, substrate 12 is composed of a non-conductive material such as glass; but, if the finished capacitor is to be used in a monolithic integrated circuit, substrate 12 is composed of a semiconductive material such as silicon. Thin dielectric film 13 is then disposed on conductive film 11 also by conventional techniques such as evaporation. Dielectric film 13 is composed of a dielectric material such as silicon monoxide.

Conductive film 11 is charged up to the positive potential which is supplied by a source of D.C. potential represented by battery 14 and potentiometer 15. Conductive film 11 is coupled to the potential source by a conductive strip 16 on substrate 12, typically a strip of silver paint, and resistor 17. The potential source is bypassed by capacitor 18.

Electron gun 21 having cathode 20 produces an electron beam that scans the naked surface of dielectric film 13 point-by-point. This causes the naked surface to charge up to the potential of cathode 20. The surface of the dielectric film 13 which is scanned by the electron beam is naked since, if it were covered by the conductive film which serves as the other electrode of the finished capacitor faults or variations in thickness of dielectric film 13 would be masked.

As will be understood by those skilled in the art, electron gun 21, dielectric film 13, conductive film 11, and substrate 12 should be maintained in a high vacuum atmosphere.

The charging of the naked surface of the dielectric 13 to the potential of cathode 20 and the charging of conductive film 11 to the potential supplied by battery 14 and potentiometer 15, which may be called the target voltage, creates an electric field across dielectric film 13.

In using the present invention to determine the uniformity of thickness of dielectric film 13, the target voltage should be large enough to cause substantial current to flow through all points of dielectric film 13 as scanned by the electron beam. In using the present invention to determine the location and severity of faults in dielectric film 13, such as fault 22, the target voltage should be of such magnitude as to cause substantially greater current to flow through points on dielectric film 13 which contain faults than through points thereon which are fault free.

Resistor 17, the size of which is chosen to achieve the desired bandwidth in accord with principles well known in the television art, senses the presence of and changes in current flowing through dielectric film 13 and produces a proportional voltage. This voltage is coupled to measuring and display equipment 23 by D.C. blocking capacitor 24 and D.C. restorer and amplifier 25. D.C. blocking capacitor 24 isolates measuring and display equipment 23 from the D.C. potential supplied by battery 14 and potentiometer 15. The D.C. restorer and amplifier 25 permits the voltage across resistor 17 to be dynamically detected and coupled to the input of measuring and display equipment 23.

Typically, measuring and display equipment 23 may include any combination of equipment such as television monitors, oscilloscopes, or recorders. Sync circuit 26 coordinates the measuring and display equipment 23 with the sweeping of the electron beam produced by electron gun 21 so that the location of any current flow through dielectric film 13 may be analytically determined. If measuring and display equipment 23 comprises equipment such as television monitors of oscilloscopes, sync circuit 26 is connected to the respective sweep circuits for electron gun 21 and the television monitors or oscilloscopes of measuring and display equipment 23.

Figure 2:
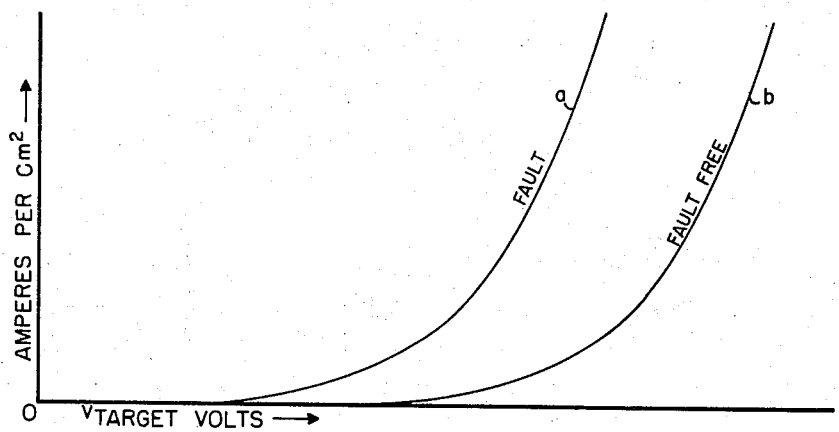
FIG. 2 is a plot of the density of the current flowing through the dielectric vs. the target voltage and illustrates the difference in such current density between points on the dielectric containing faults and points thereon which are fault free.

FIG. 2 illustrates the difference in the density of the current flowing through a point on dielectric film 13 which contains a fault and the density of the current flowing through a point on dielectric 13 which is fault free. Curve *a* represents the current density vs. target voltage characteristic typical for a point on dielectric film 13 which contains a fault. Curve *b* represents a typical current density vs. target voltage characteristic for a fault free point. As can be seen, curves *a* and *b* are logarithmic like. Therefore, though it is possible to adjust the target voltage so that no current will flow through fault free points on dielectric 13 whereas current will flow through points thereon which contain faults, it may be desirable to choose a slightly larger target voltage and have a little current flowing through fault free points since the larger target voltage will, as can be seen from FIG. 2, increase the sensitivity.

Figure 3:
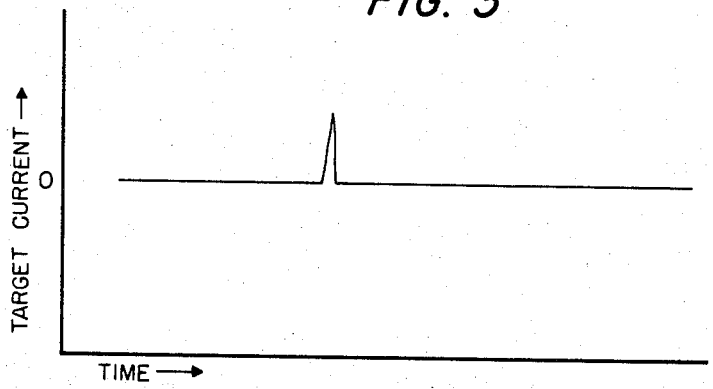
FIG. 3 is a plot, for one scan of the electron beam across the dielectric, of the current flowing through the dielectric vs. time and shows the increase in such current flow when a fault is scanned.

FIG. 3 shows how faults in dielectric 13 are detected. The curve represents the current flowing through dielectric 13, referred to as the target current, for one sweep of the electron beam across dielectric 13 and is plotted in terms of target current vs. time. As can be seen, the target current increases as the electron beam scans a point on dielectric film 13 which contains a fault, such as point 22 (FIG. 1). The greater the target current, the more severe the fault. In quality control, a dielectric is rejected if the target current exceeds a predetermined maximum since this would indicate a fault in the dielectric that exceeds allowable tolerances.

FIG. 4 shows the current density vs. target voltage characteristics of different points on the dielectric film as a function of the thickness of the film at the respective points. Curve *c* represents the characteristic of a point on the film which is thinner than the point characterized by curve *d*.

FIG. 5 shows how the current flowing through dielectric film 13 varies as a function of its thickness. The curve is plotted in terms of current flowing through dielectric 13 vs. time and represents the variations in current flow for one scan of the electron beam across dielectric film 13. In the curve of FIG. 5, the current is proportional to the point-by-point thickness of the dielectric, i.e., the greater the current, the thinner the dielectric. In a quality control operation, maximum limits of variation are set and a dielectric which produces greater variations is rejected since the variations indicate the non-uniformity in the thickness of the dielectric film.

Thus, it can be seen that the present invention provides apparatus and methods to detect faults in thin dielectric films and to determine the uniformity of thickness of such films.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A quality control system for testing thin dielectric films having opposed sides comprising:
   electron beam producing means for scanning with an electron beam one side of a dielectric film under test;
   a conductive member for electrically engaging the other side of the film under test;
   energization circuit means including said conductive member operatively associated with said electron beam producing means to establish an electric field across the film under test; and
   sensing means coupled to sense any current flowing through said film under test.

2. The system of claim 1 wherein said conductive member is a thin film conductor having first and second opposed sides with said first side of said conductor making contact with said other side of the film under test.

3. The system of claim 2 further including:
   a supporting substrate member upon which said second side of said conductive member is supported.

4. The system of claim 3 further including:
   test indication means responsive to said sensing means; and
   coordinating means intercoupling said beam producing means with said indication means to coordinate said indication means with the scanning of said one side of the film under test to thereby provide an analytical indication of the point on said film through which any current sensed by said sensing means is flowing.

5. A quality control system for testing the thickness of a thin dielectric film comprising:
   a conductive member for electrically engaging one side of the film under test;
   a supporting substrate member engaging and supporting said conductive member;
   electron beam producing means for scanning with an electron beam a second side of the film under test so as to charge the second side to a negative potential;
   D.C. potential means electrically coupled to said conductive member for charging said conductive member to a predetermined positive potential and for creating an electric field across said film large enough to cause substantial current to flow through all points of said film when scanned by said electron beam;
   said potential means being of sufficient magnitude so as to cause a substantially different current to flow through points on the film which contain faults than through points thereon which are fault free;
   a resistor electrically coupled between said potential means and said conductive member for sensing the presence of and changes in the current flowing through the film under test;
   said resistor being adapted to produce a voltage proportional to the current flowing through said film;
   D.C. restorer-amplifier means electrically coupled between said resistor and said electron beam producing means to dynamically detect and amplify the voltage produced across said resistor;
   measuring-display means electrically coupled between said restorer-amplifier means and said electron beam producing means for displaying the value of current flowing through all points of said film; and
   coordinating means intercoupling said measuring-display means to said electron beam producing means to coordinate the operation of said measuring-display means with the scanning of said second side of the film under test to thereby provide an instantaneous analytical indication of the point on said film through which any current sensed by said resistor is flowing and the amount of current flowing therethrough.

References Cited

UNITED STATES PATENTS

| | | | |
|---|---|---|---|
| 2,507,590 | 5/1950 | Clark | 324—121 X |
| 2,873,425 | 2/1959 | Huggins | 324—54 |
| 2,942,248 | 6/1960 | Huggins | 324—54 X |
| 3,051,860 | 8/1962 | Haine et al. | 250—49.5 X |
| 3,103,584 | 9/1963 | Shapiro et al. | 250—49.5 |
| 3,253,217 | 5/1966 | Voltmann | 324—54 X |

OTHER REFERENCES

Muray, Julius J., "Surface Conductivity of Borosilicate Glass," Journal of Applied Physics, April 1962, vol. 33, No. 4, pp. 1525–1531.

RUDOLPH V. ROLINEC, *Primary Examiner.*

WALTER L. CARLSON, *Examiner.*

G. R. STRECKER, *Assistant Examiner.*